(12) United States Patent  
Nivlet (10) Patent No.: US 11,268,352 B2  
(45) Date of Patent: Mar. 8, 2022

(54) CONTROLLING FLUID VOLUME VARIATIONS OF A RESERVOIR UNDER PRODUCTION

(71) Applicant: Saudi Arabian Oil Company, Dhahran (SA)

(72) Inventor: Philippe Nivlet, Manama (BH)

(73) Assignee: Saudi Arabian Oil Company, Dhahran (SA)

( * ) Notice: Subject to any disclaimer, the term of this patent is extended or adjusted under 35 U.S.C. 154(b) by 220 days.

(21) Appl. No.: 16/371,573

(22) Filed: Apr. 1, 2019

(65) Prior Publication Data

US 2020/0308935 A1    Oct. 1, 2020

(51) Int. Cl.
| | |
|---|---|
| *E21B 41/00* | (2006.01) |
| *E21B 43/16* | (2006.01) |
| *E21B 49/00* | (2006.01) |
| *G05B 17/02* | (2006.01) |

(Continued)

(52) U.S. Cl.
CPC .......... *E21B 41/0092* (2013.01); *E21B 43/16* (2013.01); *E21B 49/00* (2013.01); *G01V 1/28* (2013.01); *G05B 17/02* (2013.01); *G01V 1/50* (2013.01); *G01V 2210/667* (2013.01)

(58) Field of Classification Search
CPC ...... E21B 41/0092; E21B 43/16; E21B 49/00; G01V 1/28; G01V 1/50; G01V 2210/667; G05B 17/02

See application file for complete search history.

(56) References Cited

U.S. PATENT DOCUMENTS

| | | |
|---|---|---|
| 3,731,270 A | 5/1973 | Penhollow |
| 7,966,882 B2 | 6/2011 | Greenwood et al. |
| 9,477,000 B2 | 10/2016 | Yang |

(Continued)

FOREIGN PATENT DOCUMENTS

| | | |
|---|---|---|
| CN | 101105537 | 1/2008 |
| CN | 102269821 | 12/2011 |

(Continued)

OTHER PUBLICATIONS

Huang et al., "Direct correlation of 4D seismic with well activity for a clarified dynamic reservoir interpretation," Geophysical Prospecting, Aug. 2011, 60(2), 293-312.

(Continued)

*Primary Examiner* — Kamini S Shah  
*Assistant Examiner* — Peter Pham  
(74) *Attorney, Agent, or Firm* — Fish & Richardson P.C.

(57) ABSTRACT

Techniques for controlling a hydrocarbon production system include determining a first estimate of a prior FVC detectability probability map based on a plurality of reservoir data that includes four-dimensional (4D) seismic data of a subterranean reservoir; determining a second estimate of the prior FVC detectability probability map under seismic data noise conditions; determining an updated detectable FVC probability based on the 4D seismic data; determining an updated FVC probability based on the updated detectable FVC probability and the first and second estimates of the prior FVC detectability probability maps; and generating a control instruction for at least one of a fluid injection system or a hydrocarbon production assembly based on the updated FVC probability.

31 Claims, 7 Drawing Sheets

(51) Int. Cl.
G01V 1/28 (2006.01)
G01V 1/50 (2006.01)

(56) References Cited

U.S. PATENT DOCUMENTS

| | | | |
|---|---|---|---|
| 10,107,927 B2 | 10/2018 | Alkhatib | |
| 10,914,853 B2 | 2/2021 | Al-Ali et al. | |
| 2001/0021940 A1 | 9/2001 | Fuji | |
| 2005/0088913 A1 | 4/2005 | Lecomte | |
| 2008/0019215 A1 | 1/2008 | Robertsson et al. | |
| 2008/0195358 A1* | 8/2008 | El Ouair | G01V 1/30 703/2 |
| 2008/0294387 A1 | 11/2008 | Anderson et al. | |
| 2010/0177595 A1 | 7/2010 | Khare et al. | |
| 2010/0185422 A1* | 7/2010 | Hoversten | G01V 11/00 703/2 |
| 2011/0144965 A1* | 6/2011 | Rossi | E21B 43/00 703/10 |
| 2011/0153285 A1* | 6/2011 | Da Veiga | G01V 11/00 703/1 |
| 2011/0199860 A1 | 8/2011 | Houck et al. | |
| 2011/0246161 A1* | 10/2011 | Morton | E21B 49/00 703/9 |
| 2011/0292764 A1* | 12/2011 | Kelly | G01V 1/307 367/38 |
| 2012/0113750 A1 | 5/2012 | Al-Momin et al. | |
| 2013/0245952 A1* | 9/2013 | Lin | E21B 43/20 702/12 |
| 2013/0301387 A1 | 11/2013 | Van Groenstijn | |
| 2014/0019108 A1* | 1/2014 | Da Veiga | G01V 99/005 703/10 |
| 2014/0172307 A1 | 6/2014 | Svay et al. | |
| 2014/0200815 A1 | 7/2014 | Muroyama et al. | |
| 2015/0006083 A1 | 1/2015 | McAuliffe et al. | |
| 2016/0091624 A1 | 3/2016 | Haacke et al. | |
| 2016/0281497 A1* | 9/2016 | Tilke | E21B 49/00 |
| 2016/0282490 A1 | 9/2016 | Qin et al. | |
| 2016/0320509 A1 | 11/2016 | Almuhaidib | |
| 2016/0356905 A1 | 12/2016 | Alkhatib et al. | |
| 2017/0177992 A1* | 6/2017 | Klie | G06F 30/20 |
| 2017/0315266 A1* | 11/2017 | Myers | G01V 99/005 |
| 2018/0106137 A1* | 4/2018 | Frosell | E21B 47/12 |
| 2018/0120461 A1 | 5/2018 | Allegar et al. | |
| 2018/0267187 A1 | 9/2018 | Al-Ali et al. | |
| 2019/0129049 A1* | 5/2019 | Magill | G01V 1/308 |
| 2019/0196039 A1* | 6/2019 | Wilson | G01V 1/28 |
| 2019/0353814 A1 | 11/2019 | Cha et al. | |

FOREIGN PATENT DOCUMENTS

| | | |
|---|---|---|
| CN | 105652344 | 6/2016 |
| GB | 2433780 | 7/2007 |
| WO | 2019055565 | 3/2019 |

OTHER PUBLICATIONS

Yin et al., "Enhancement of dynamic reservoir interpretation by correlating multiple 4D seismic monitors to well behavior," Interpretation, May 2015, 3(2): SP35-SP52.
PCT International Search Report and Written Opinion in International Appln. No. PCT/US2020/025679, dated Jul. 14, 2020, 15 pages.
Gulf Cooperation Council Examination Report issued in GCC Application No. GC 2018-34966 dated Oct. 6, 2019, 4 pages.
GCC Examination Report in GCC Appln. No. GC 2018-34966, dated Aug. 31, 2020, 3 pages.
Al-Ali et al., "An integrated method for resolving the seismic complex near-surface problem," Geophysical Prospecting, Nov. 2006, 54:739-750.
Liu et al., "A Target-oriented imaging approach for continuous seismic reservoir monitoring," presented at the 79th EAGE Conference & Exhibition, Paris, France, Jun. 12-15, 2017, 5 pages.
Xu et al., "3D angle gathers from reverse time migration," Geophysics, Society of Exploration Geophysicists, Mar. 2011, 76(3): 77-92.
PCT International Search Report and Written Opinion in International Appln. No. PCT/US2020/028428, dated Jul. 24, 2020, 16 pages.
Liu and Al-Ali, "Common-focus point-based target-oriented imaging approach for continuous seismic reservoir monitoring," Geophysics vol. 83, Issue 4, Jul.-Aug. 2018, 8 pages.
CN Office Action issued in Chinese Appln. No. 201880028403.3, dated Apr. 16, 2021, 14 pages (With English Translation).
International Search Report and Written Opinion issued in International Application No. PCT/US2018/022164 dated Jun. 27, 2018, 14 pages.
Al-Ali, "Land seismic data and acquisition and preprocessing: an operator solution to the near-surface problem," retrieved from the Internet via URL: <https://repository.tudelft.nl/islandora/object/uuid:baa60972-94c0-4c74-8642-6015db8e61a0?collection=research#>, retrieved on Jun. 11, 2018, published Jun. 18, 2007, 34 pages.
Berkhout, "Pushing the limits of seismic imaging, Part I: Prestack migration in terms of double dynamic focusing," Geophysics vol. 62, No. 3, May 1, 1997, 17 pages.
Carvalho dos Santos et al., "Semi-Quantitative 4D Seismic Interpretation Integrated with Reservoir Simulation: Application to the Norne Field," Interpretation, vol. 6, Issue 3, Aug. 2018, 11 pages.
Chadwick et al., "4D Seismic quatification of a prowing CO2 plume at Sleipner, North Sea," in Dore and Vining, Petroleum Geology: North-West European and Global Perspectives—Proceeding of the 6th Petroleum Geology Conference, 2005, 15 pages.
Gousselin et al., "History of Matching Using Time-Lapse Sesimic (HUTS)," SPE-84464-MS, presented at the SPE Annual Technical Conference and Exhibition, Oct. 5-8, 2003, 2 pages, Abstract Only.
Hodgson et al., "Generating value from 4D through efficient integration," The Leading Edge, Vo. 36, No. 5, May 2017, 6 pages.
Huang et al., "The First Post-Injection Seismic Monitor Survey at the Ketzin Pilot CO2 Storage Site: Results from Time-Lapse Analysis," Geophysical Prospecting, vol. 66, Issue 1, Jan. 2018, 23 pages.
Nivlet et al., "A New Methodology to Account for Uncertainties in 4D Seismic Interpretation," Processions of the SEG Annual Meeting, San Antonio, Sep. 9-14, 2001, 4 pages.
Skjervheim et al., "Incoporating 4D Seismic Data in Reservoir Simulation Models Using Ensemble Kalman Filter," SPE 95789, presented at the 2005 SPE Annual Technical Conference and Exhibition on Oct. 9-12, 2005, 11 pages.
Winthaegen et al., "CFP-approach to time-lapse angle-dependent reflectivity analysis," SEG International Exposition and Annual Meeting, Sep. 9, 2001, 4 pages.

\* cited by examiner

CONTROLLING FLUID VOLUME VARIATIONS OF A RESERVOIR UNDER PRODUCTION

TECHNICAL FIELD

The present disclosure relates to systems and methods for controlling reservoir fluid volume with seismic data and a reservoir model.

BACKGROUND

Four-dimensional (4D) seismic data are developed by repeating seismic acquisition at different times over a reservoir, such as a reservoir under production. Acquisition and processing of the multiple seismic acquisitions are typically as similar as possible so that the differential amplitude at the reservoir level can be attributed with confidence to fluid volume change ("FVC") (for example, pressure or saturation). Four-dimensional seismic data has good spatial coverage of the reservoir and has been used to map FVC.

SUMMARY

In a general implementation, a computer-implemented method for controlling a hydrocarbon production system includes determining, with a hydrocarbon production system control system, a first estimate of a prior FVC detectability probability map based on a plurality of reservoir data that includes four-dimensional (4D) seismic data of a subterranean reservoir. The method further includes determining, with the hydrocarbon production system control system, a second estimate of the prior FVC detectability probability map under seismic data noise conditions. The method further includes determining, with the hydrocarbon production system control system, an updated detectable FVC probability based on the 4D seismic data. The method further includes determining, with the hydrocarbon production system control system, an updated FVC probability based on the updated detectable FVC probability and the first and second estimates of the prior FVC detectability probability maps. The method further includes generating, with the hydrocarbon production system control system, a control instruction for at least one of a fluid injection system or a hydrocarbon production assembly based on the updated FVC probability.

In an aspect combinable with the general implementation, the plurality of data further includes at least one of an average reservoir model of the subterranean reservoir, a set of equally probable history-matched reservoir models of the subterranean reservoir, or a rock physics model of a rock formation of the subterranean reservoir.

Another aspect combinable with any of the previous aspects further includes determining, with the hydrocarbon production system control system, an estimate of a probability that the 4D seismic data provides a correct diagnostic about the minimum detectable FVC.

Another aspect combinable with any of the previous aspects further includes determining, with the hydrocarbon production system control system, an estimate of a minimal detectable FVC; and generating, with the hydrocarbon production system control system, at least one estimate map of seismic detectability based at least in part on the estimate of the prior FVC detectability probability map.

In another aspect combinable with any of the previous aspects, the first estimate of the prior FVC detectability probability map is determined exclusive of seismic data noise conditions.

In another aspect combinable with any of the previous aspects, determining the updated detectable FVC probability based on the 4D seismic data includes evaluating a plurality of conditional probabilities.

In another aspect combinable with any of the previous aspects, the plurality of conditional probabilities include:

$$\begin{cases} p(v^+/4D^+) = \dfrac{p(v^+)}{p(v^+) + [1-p(v^+)]\dfrac{p(4D^+/v^-)}{p(4D^+/v^+)}} \\ p(v^+/4D^-) = \dfrac{p(v^+)}{p(v^+) + [1-p(v^+)]\dfrac{p(4D^-/v^-)}{p(4D^-/v^+)}} \\ p(v^-/4D^+) = \dfrac{1-p(v^+)}{1-p(v^+) + p(v^+)\dfrac{p(4D^+/v^+)}{p(4D^+/v^-)}} \\ p(v^-/4D^-) = \dfrac{p(v^+)}{1-p(v^+) + p(v^+)\dfrac{p(4D^-/v^+)}{p(4D^-/v^-)}} \end{cases}$$

In another aspect combinable with any of the previous aspects, the control instruction for at least one of the fluid injection system or the hydrocarbon production assembly includes at least one of instructing the fluid injection system to reduce or stop circulating an fluid injectant into one or more injection wellbores; or instructing the fluid injection system to increase a rate of circulating the fluid injectant into one or more injection wellbores.

In another aspect combinable with any of the previous aspects, the control instruction for at least one of the fluid injection system or the hydrocarbon production assembly includes at least one of instructing the hydrocarbon production assembly to reduce or stop producing a hydrocarbon fluid from one or more production wellbores; or instructing one or more inflow control devices positioned on the one or more production wellbores to close.

In another aspect combinable with any of the previous aspects, the control instruction for at least one of the fluid injection system or the hydrocarbon production assembly includes at least two of instructing the fluid injection system to reduce or stop circulating an fluid injectant into one or more injection wellbores instructing the fluid injection system to increase a rate of circulating the fluid injectant into one or more injection wellbores; instructing the hydrocarbon production assembly to reduce or stop producing a hydrocarbon fluid from one or more production wellbores; or instructing one or more inflow control devices positioned on the one or more production wellbores to close.

In another general implementation, a hydrocarbon production system control system includes one or more memory modules that store a plurality of reservoir data that includes four-dimensional (4D) seismic data of a subterranean reservoir and a set of instructions, and one or more hardware processors. The one or more hardware processors is configured to execute the set of instructions to perform operations that include determining a first estimate of a prior FVC detectability probability map based on a plurality of reservoir data that includes four-dimensional (4D) seismic data of a subterranean reservoir. The operations further include determining a second estimate of the prior FVC detectability probability map under seismic data noise conditions. The operations further include determining an updated detectable FVC probability based on the 4D seismic data. The operations further include determining an updated FVC probability based on the updated detectable FVC probability and the first and second estimates of the prior FVC detectability probability maps. The operations further include generating a control instruction for at least one of a fluid injection system or a hydrocarbon production assembly based on the updated FVC probability.

In an aspect combinable with the general implementation, the plurality of data further includes at least one of an average reservoir model of the subterranean reservoir, a set of equally probable history-matched reservoir models of the subterranean reservoir, or a rock physics model of a rock formation of the subterranean reservoir.

In another aspect combinable with any of the previous aspects, the operations further include determining an estimate of a probability that the 4D seismic data provides a correct diagnostic about the minimum detectable FVC.

In another aspect combinable with any of the previous aspects, the operations further include determining an estimate of a minimal detectable FVC; and generating at least one estimate map of seismic detectability based at least in part on the estimate of the prior FVC detectability probability map.

In another aspect combinable with any of the previous aspects, the first estimate of the prior FVC detectability probability map is determined exclusive of seismic data noise conditions.

In another aspect combinable with any of the previous aspects, the operation of determining the updated detectable FVC probability based on the 4D seismic data includes evaluating a plurality of conditional probabilities.

In another aspect combinable with any of the previous aspects, the plurality of conditional probabilities include:

$$\begin{cases} p(v^+/4D^+) = \dfrac{p(v^+)}{p(v^+) + [1 - p(v^+)]\dfrac{p(4D^+/v^-)}{p(4D^+/v^+)}} \\ p(v^+/4D^-) = \dfrac{p(v^+)}{p(v^+) + [1 - p(v^+)]\dfrac{p(4D^-/v^-)}{p(4D^-/v^+)}} \\ p(v^-/4D^+) = \dfrac{1 - p(v^+)}{1 - p(v^+) + p(v^+)\dfrac{p(4D^+/v^+)}{p(4D^+/v^-)}} \\ p(v^-/4D^-) = \dfrac{p(v^+)}{1 - p(v^+) + p(v^+)\dfrac{p(4D^-/v^+)}{p(4D^-/v^-)}} \end{cases}$$

In another general implementation, a wellbore production system includes a fluid injection system fluidly coupled to an injection wellbore and operable to circulate an injection fluid through the injection wellbore and into a subterranean reservoir, a hydrocarbon production assembly fluidly coupled to a production wellbore and operable to circulate a hydrocarbon fluid through the production wellbore from the subterranean reservoir, and a hydrocarbon production system control system communicably coupled to the fluid injection system and the hydrocarbon production system. The hydrocarbon production system control system is configured to perform operations including determining a first estimate of a prior FVC detectability probability map based on a plurality of reservoir data that includes four-dimensional (4D) seismic data of the subterranean reservoir; determining a second estimate of the prior FVC detectability probability map under seismic data noise conditions; determining an updated detectable FVC probability based on the 4D seismic data; determining an updated FVC probability based on the updated detectable FVC probability and the first and second estimates of the prior FVC detectability probability maps; and generating a control instruction for at least one of the fluid injection system or the hydrocarbon production assembly based on the updated FVC probability.

In an aspect combinable with the general implementation, the plurality of data further includes at least one of an average reservoir model of the subterranean reservoir, a set of equally probable history-matched reservoir models of the subterranean reservoir, or a rock physics model of a rock formation of the subterranean reservoir.

In another aspect combinable with any of the previous aspects, the operations further include determining an estimate of a probability that the 4D seismic data provides a correct diagnostic about the minimum detectable FVC; determining an estimate of a minimal detectable FVC; and generating at least one estimate map of seismic detectability based at least in part on the estimate of the prior FVC detectability probability map.

In another aspect combinable with any of the previous aspects, the first estimate of the prior FVC detectability probability map is determined exclusive of seismic data noise conditions.

In another aspect combinable with any of the previous aspects, the operation of determining the updated detectable FVC probability based on the 4D seismic data includes evaluating a plurality of conditional probabilities.

In another aspect combinable with any of the previous aspects, the control instruction includes at least one of adjusting a flow rate of the injection fluid circulated by the fluid injection system through the injection wellbore; adjusting a flow rate of the hydrocarbon fluid circulated by the hydrocarbon production assembly through the production wellbore; or adjusting a position of one or more inflow control devices on the production wellbore.

Implementations according to the present disclosure may include one or more of the following features. For example, implementations according to the present disclosure may distinguish between an FVC detectability from a reservoir model and an FVC detectability from 4D seismic data. As another example, implementations according to the present disclosure integrate different data types to update a model (for example, FVC from the reservoir model) while accounting for an intensity of the update by an amount of 4D seismic data noise and an intensity of the 4D signal. Thus, implementations according to the present disclosure may account for and propagate uncertainty, such as data uncertainty or modelling uncertainty, in updating FVC probability of a reservoir.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

Figure 1:
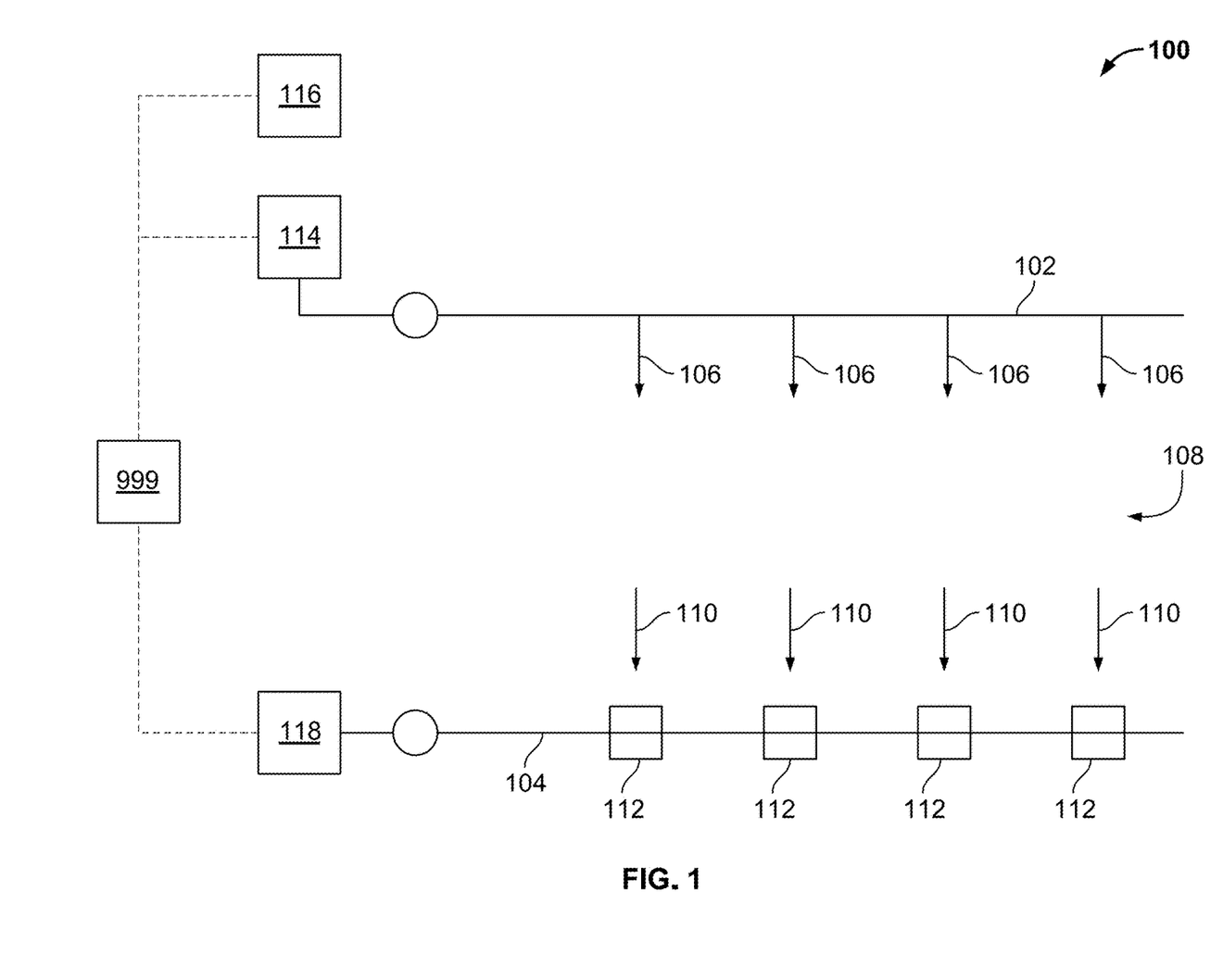
FIG. 1 illustrates a top view of an example implementation of a hydrocarbon production system that includes an injection wellbore (and injection control devices) and a production wellbore (and production control devices) according to the present disclosure.

FIG. 1 illustrates a top view of an example implementation of a hydrocarbon production system 100 that includes an injection wellbore 102 and a production wellbore 104. Hydrocarbon production system 100 also includes a hydrocarbon production system control system 999. In some aspects, the hydrocarbon production system control system 999 may operate to control one or both of a fluid injection assembly 114 and a hydrocarbon production assembly 118 (shown schematically in FIG. 1 in block form). For example, hydrocarbon production system control system 999 may include a computer-based (for example, hardware microprocessor-based) system that executes software-encoded instructions to integrate 4D seismic data with an FVC prediction from a history-matched reservoir model and an estimation of associated non-repeatable noise to determine an updated FVC probability that, in some aspects, is used to control one or both of fluid injection assembly 114 and hydrocarbon production assembly 118. In some aspects, the hydrocarbon production system control system 999 identifies and accounts for different sources of uncertainty in the process described in the present disclosure, including, for example, 4D data and the interpretation uncertainty.

FIG. 1 illustrates a schematic plan view showing the wellbores 102 and 104 as single, horizontal wellbores separated by a particular distance through a hydrocarbon bearing formation 108, or reservoir 108. Wellbores 102 and 104 are illustrated as single leg, horizontal wellbores. Other types of wellbores are also contemplated by the present disclosure. For example, one or both of the injection wellbore 102 and the production wellbore 104 may be vertical wellbores. One or both of the injection wellbore 102 and the production wellbore 104 may have multiple laterals that extend from the respective wellbore. One or both of the injection wellbore 102 and the production wellbore 104 may be cased or uncased. In some aspects, although FIG. 1 illustrates the wellbores 102 and 104 as being of the same or similar vertical depth (for example, within a common horizontal plane in the reservoir 108), the wellbores 102 and 104 may be formed within the reservoir at different vertical depths. In some cases, there may be multiple wellbores 102 and a single wellbore 104, multiple wellbores 104 and a single wellbore 102, or multiple wellbores 102 and multiple wellbores 104 in the reservoir 108.

As illustrated, a fluid injection assembly 114 (for example, a system of one or more pumps, one or more valves, and one or more sources of injection fluid such as $CO_2$) is operable to circulate an injection fluid 106 through the injection wellbore 102 and into the reservoir 108 in a secondary or tertiary recovery process. For example, the injection fluid 106, such as water or gas, may be pumped through the wellbore 102 into the reservoir 108 to maintain reservoir pressure so that hydrocarbons may be produced from the production wellbore 104. In some instances, for example, separated gas from the production wellbore 104 may be reinjected into the reservoir from the wellbore 102. In some cases, such as offshore wells, water may be injected into the reservoir 108 from the wellbore 102.

As shown in this example, inflow control devices (ICDs) or inflow control valves (ICVs) 112 are positioned at intervals on the production wellbore 104. Generally, an ICD or ICV is a component installed as part of a well completion to help optimize production by equalizing reservoir inflow along a length of the wellbore. In some instances, as is shown in this figure, multiple ICDs 112 can be installed along the reservoir section of the wellbore 104. Each ICD 112 can be configured to a specific setting to partially choke flow of hydrocarbons into the production wellbore 104. Thus, the ICDs 112 can be used to delay or direct hydrocarbons into particular sections of the production wellbore 104 by reducing an annular velocity across a selected interval of the wellbore 104.

Generally, an ICV is an active component (whereas, in some aspects, an ICD is a passive component) that can be controlled from a terranean surface to maintain flow conformance into the production wellbore 104. The ICV 112 can also be controlled to stop unwanted fluids (for example, injectant fluid) from entering the wellbore 104. In some aspects, an ICV can be connected, for control purposes, to a cable that extends to the surface that provides electric conduits, hydraulic conduits, or both, to relay commands from the surface to the ICV. Alternatively, or additionally, the ICV can be controlled from a downhole controller that is located, for example, in the injection wellbore 102 or production wellbore 104. In the present disclosure, the terms ICD and ICV are generally interchangeable, as both may refer to a flow control apparatus that can be controlled from the surface.

In the example shown in FIG. 1, a hydrocarbon production assembly 118 is illustrated at the production wellbore 104. The hydrocarbon production assembly 118, generally, may include one or more pumps, one or more valves, and related components to circulate hydrocarbons 110 produced from the reservoir 108 (for example, pushed toward the wellbore 104 by the injection fluid 106) into the wellbore 104.

In this example implementation, a 4D seismic data acquisition system 116 is illustrated schematically. Generally, the 4D seismic data acquisition system 116 is operable to acquire 4D seismic data for the reservoir 108. For example, the 4D seismic data acquisition system 116 gathers three-dimensional seismic data at different times or over a particular time duration over the reservoir 108 to assess changes in the reservoir 108 with time. Changes may be observed in hydrocarbon or injection (or both) fluid location and saturation, pressure and temperature. The 4D seismic data acquisition system 116 can operate to acquire this seismic data at a terranean surface or in one or both of the wellbores 102 or 104.

In some aspects (as shown in FIG. 1), the hydrocarbon production system control system 999 is communicably coupled to the fluid injection assembly 114, the 4D seismic data acquisition system 116, and the hydrocarbon production assembly 118. In some aspects, the hydrocarbon production system control system 999 receives data from one or more of the fluid injection assembly 114, the 4D seismic data acquisition system 116, and the hydrocarbon production assembly 118. In some aspects, the hydrocarbon production system control system 999 may also send commands to one or more of the fluid injection assembly 114, the 4D seismic data acquisition system 116, and the hydrocarbon production assembly 118 in order to operate (or adjust the operation of) one or more of the fluid injection assembly 114, the 4D seismic data acquisition system 116, and the hydrocarbon production assembly 118 according to the present disclosure.

In some aspects, the hydrocarbon production system control system 999 stores or references particular data inputs to operate or adjust the operation of the fluid injection assembly 114, the 4D seismic data acquisition system 116, and the hydrocarbon production assembly 118. For example, input data can include an average reservoir model (of the reservoir 108) after history-matching to a given period of time comprising 3D geo-cellular models with time-invariant reservoir parameters (for example, facies) and time-variant parameters (for example, fluid saturations and pressure). In some aspects, the time-variant parameters are available at calendar times $T_0, T_1, \ldots, T_n$ (where $T_0$ is an initial time and $T_1 \ldots T_n$ are points in time beyond the initial time at times 1 ... n). The input data can also include a set of equally probable history-matched reservoir models (of the reservoir 108) that reflect an uncertainty in the different reservoir parameters over time. The input data can also include a pre-existing rock physics model (for example, based on well log data analysis and calibrated on direct laboratory measurements of the rock formation of the reservoir 108). This model may facilitate mapping of reservoir parameters to elastic parameters. The input data can also include 4D seismic data (for example, acquired by the 4D seismic data acquisition system 116) available at times $T_0, \ldots, T_n$. This input data may be, for instance, 4D post-stack amplitudes, 4D pre-stack amplitudes, 4D inverted elastic parameters, 4D seismic attributes extracted, or a combination thereof.

In some aspects, the hydrocarbon production system control system 999 may operate to distinguish between the FVC detectability from the reservoir model (referred to as $v^+$) and the FVC detectability from the seismic (referred to as $4D^+$). The former is the ability of synthetic 4D seismic associated with the history-matched model to identify FVC under noise conditions reflecting model uncertainty. The latter is the ability of measured 4D seismic data to identify FVC under estimated noise conditions depending on the reservoir model.

As described more fully with respect to FIG. 2 to FIG. 7, the hydrocarbon production system control system 999 performs to overall operations. First, the hydrocarbon production system control system 999 evaluates one of the four conditional probabilities (depending on the case) defined in Equation 1:

$$\begin{cases} p(v^+/4D^+) = \dfrac{p(v^+)}{p(v^+) + [1-p(v^+)]\dfrac{p(4D^+/v^-)}{p(4D^+/v^+)}} \\[2mm] p(v^+/4D^-) = \dfrac{p(v^+)}{p(v^+) + [1-p(v^+)]\dfrac{p(4D^-/v^-)}{p(4D^-/v^+)}} \\[2mm] p(v^-/4D^+) = \dfrac{1-p(v^+)}{1 - p(v^+) + p(v^+)\dfrac{p(4D^+/v^+)}{p(4D^+/v^-)}} \\[2mm] p(v^-/4D^-) = \dfrac{p(v^+)}{1 - p(v^+) + p(v^+)\dfrac{p(4D^-/v^+)}{p(4D^-/v^-)}} \end{cases} \quad \text{Eq. set 1}$$

where Eq. set 1 includes the following terms:

| Term | Meaning |
|---|---|
| $v^+$ | Detectable FVC from the reservoir model |
| $v^-$ | Undetectable FVC from the reservoir model |
| p(...) | FVC estimated map from (...) |
| $4D^+$ | Detectable FVC from 4D seismic data |
| $4D^-$ | Undetectable FVC from 4D seismic data |

Equation set 1 is the application of Bayes theorem to update FVC detectability after observing from seismic a detectable ($4D^+$) or undetectable ($4D^-$) FVC, as illustrated by FIGS. 3 to 6. Second, the hydrocarbon production system control system 999 updates the FVC prior distribution based on the previous evaluation as shown on FIG. 7. In some aspects, the hydrocarbon production system control system 999 may also control the operation of one or both of the fluid injection assembly 114 or the hydrocarbon production assembly 118 based on the updated FVC distribution.

Figure 2:
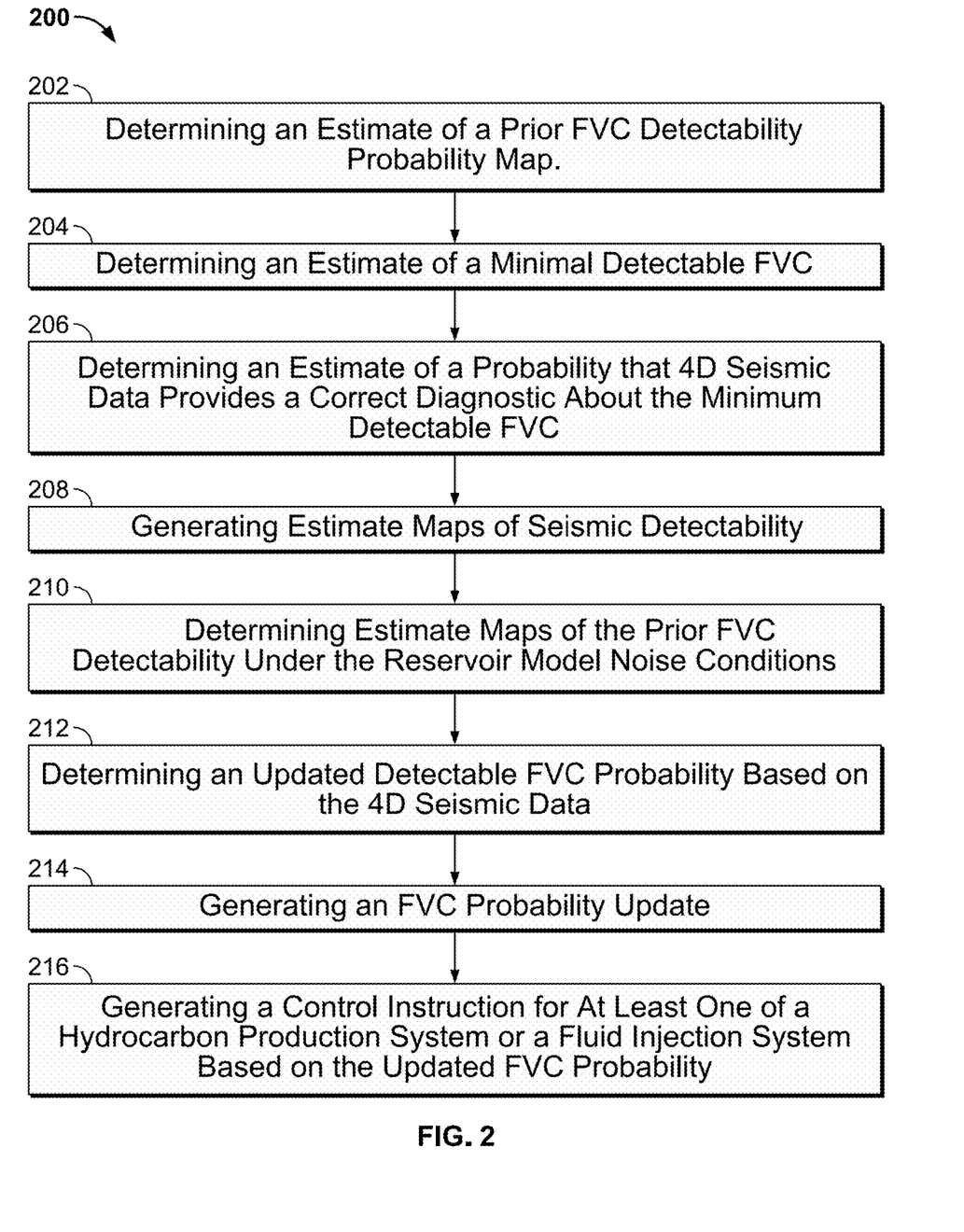
FIG. 2 is a flowchart that describes an example method for controlling hydrocarbon production or fluid injection (or both) according to the present disclosure.

FIG. 2 is a flowchart that describes an example method 200 for controlling hydrocarbon production or fluid injection (or both) by the hydrocarbon production system control system 999 based on the input data described previously. Method 200 may be implemented by or with all or part of the hydrocarbon production system 100 shown in FIG. 1. Method 200 may begin at step 202, which includes determining an estimate of prior FVC maps p(v). These maps may be estimated from the ensemble of equally probable reservoir models at calendar times $T_0, \ldots, T_n$. At each position of these maps, the distribution of FVC values may be approximated by a parametric distribution, such as Gaussian or log-normal model, or a non-parametric estimate of the distribution.

Method 200 may continue at step 204, which includes determining a minimal detectable FVC $v^+$ and, in some aspects, prior FVC detectability probability functions $p_{N/S}$ ($v^+$). These estimations vary with seismic noise as illustrated by FIGS. 3A-3C and FIG. 4. For example, the hydrocarbon production system control system 999 may, in step 202, determine an estimated synthetic 4D seismic (in other words, repeated or time-lapse 3D seismic) from the input data of the history-matched 3D reservoir model changes. Such a determination, in some aspects, is or includes a "simulation-to-seismic modelling" (otherwise known as "Sim2Seis"). Sim2Seis modelling includes, in some aspects, first a rock physics modelling step to transform reservoir static (for example, porosity, facies) and dynamic reservoir parameters (for example, fluid saturation, pressure) to elastic parameters at times $T_0, \ldots, T_n$.

Then, seismic modelling is applied from this result to produce for instance the corresponding 3D seismic post-stack amplitude cubes, for instance using a 1D convolution operation of estimated reflectivities at times $T_0, \ldots, T_n$ and a wavelet estimated from the 3D data. Three-dimensional pre-stack data may also be generated, for instance using a one-dimensional convolution operation of estimated reflectivities at times $T_0, \ldots, T_n$ for each seismic wave reflection angle and a wavelet estimated from the 3D data for the corresponding angle. Thus, 4D seismic is the difference between each amplitude cube at times $T_1, \ldots T_n$ and the amplitude at the initial time ($T_0$).

In some aspects, 4D elastic parameter variations may be used in step 202 instead of amplitudes. In such aspects, an additional step of seismic inversion would be performed as part of step 202. In other aspects, any 4D attribute extracted from 4D post- or pre-stack amplitude volume may be used in step 202 instead of amplitudes. This includes (non-exclusively) amplitude related, phase related, time related, or frequency related attributes.

In some aspects, due to the low vertical resolution of seismic, data may not generally resolve the detailed movement of the fluid in the reservoir. However, in such cases a set of seismic attribute maps extracted from the 4D cubes over the reservoir of interest (for instance, amplitude maps, acoustic impedance maps) may be related to a cumulated vertical FVC. To achieve this objective, a statistical model (for example, a multivariate linear or non-linear regression, or a neural network model) is calibrated between local FVC at times $T_1, \ldots, T_n$ and the selected set of 4D attribute maps (at the corresponding times). To check the quality of the model, predicted volumes are cross-plotted to values directly read from the reservoir model.

Figure 3A:
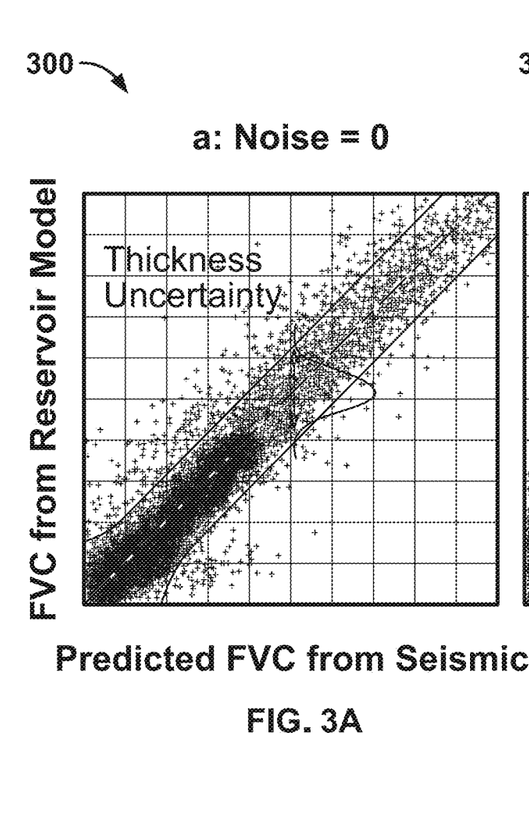
FIGS. 3A-3C show graphical images of cross-plots between a predicted FVC from 4D seismic data for a reservoir and an FVC from a reservoir model of the reservoir according to the present disclosure.

For example, FIG. 3A shows a graphical image of cross-plot between a predicted FVC from 4D seismic data for a reservoir and an FVC from a reservoir model of the reservoir, supposing that 4D seismic is measured under noise free condition (with a noise-to-signal ratio N/S of 0%). This graph includes a y-axis that represents the FVC from the reservoir model and an x-axis that represents a predicted FVC from 4D seismic data. In the lower left corner of the cross-plot graph 300 corresponding to the smallest volumes, the predicted volume is smaller than the prediction uncertainty. Hence, 4D seismic may not be used to quantify FVC.

The minimal volume that can be quantified from seismic is referred to as minimal detectable FVC. Minimal detectable FVC can be determined by a statistical test (for example, using a Student's test) that searches if the FVC from the reservoir model given the FVC predicted by the model is significantly different from 0 or not. The data may then be split into two parts according to if the FVC is greater than or lower than this limit. A classification function is calibrated between the 4D synthetic seismic data and the detectable or non-detectable class using, for instance, a statistical methodology. This model leads to a prior detectability probability function defined under the assumption that 4D seismic are noise free.

Figure 3B:
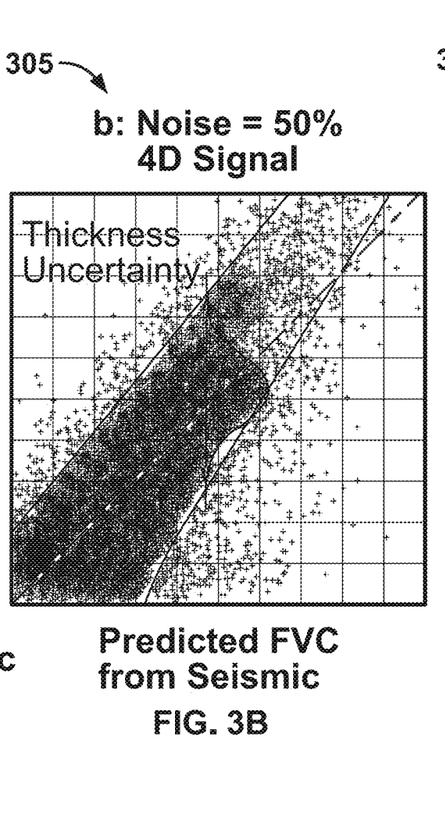
Figure 3C:
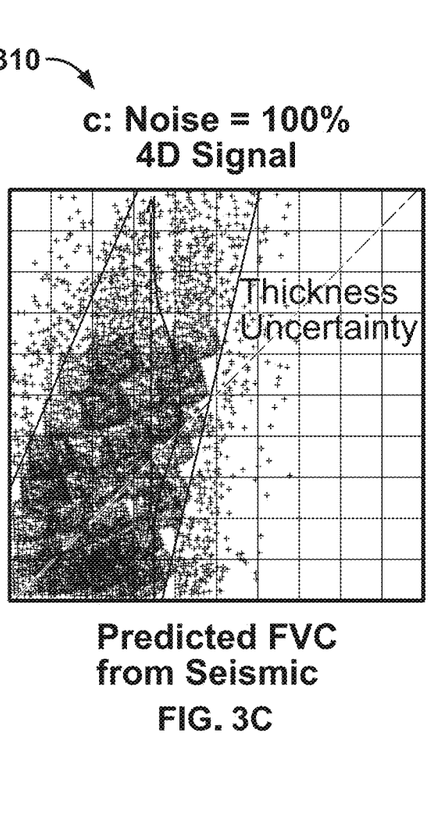
Figure 4:
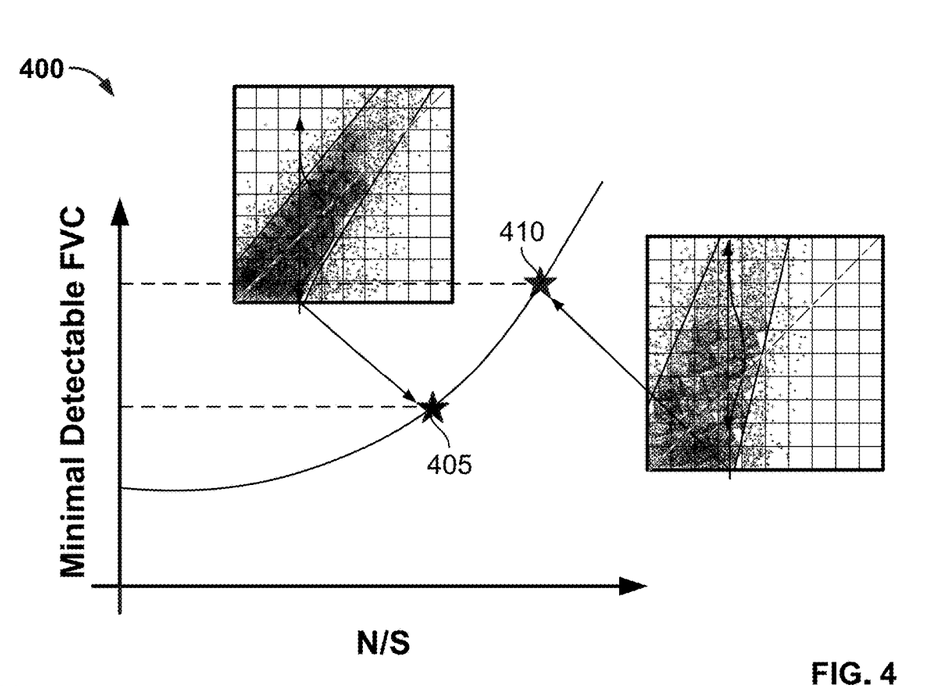
FIG. 4 is a graph showing an FVC detectability threshold relative to a Noise-to-Signal ratio ("N/S") according to the present disclosure.

Method 200 may estimate the minimal detectable FVC and prior detectability distributions in a similar way when 4D synthetic data are contaminated with noise described by the parameter N/S, different from 0. The 4D noise, in some aspects, is a colored noise with a similar frequency spectrum as the 4D signal and an intensity controlled by the 4D N/S. FIGS. 3B and 3C, for example, show cross-plot graphs 305 and 310, respectively, between the predicted FVC and value extracted from the reservoir model with a N/S of 50% and 100%, respectively.

From FIGS. 3B and 3C, the method extracts a minimal detectable FVC for a given 4D data noise level using for instance a statistical test. These estimates are marked on FIG. 4 as points 405 and 410. As shown, graph 400 includes a y axis that represents the minimal detectable FVC and an x-axis that represents the N/S ratio. By repeating the minimal FVC estimation process for different noise levels N/S, method 200 can complete the graph 400 displayed on FIG. 4, that illustrates the minimal detectable FVC dependency to 4D N/S ratio.

Method 200 may continue at step 206, which includes determining (for example, with the hydrocarbon production system control system 999) an estimate of a probability that 4D seismic data provides a correct diagnostic about the minimum detectable FVC. For example, these probabilities of respectively true positive $p(4D^+/v^+)$, false positive $p(4D^+/v^-)$, false negative $p(4D^-/v^+)$, and true negative $p(4D^-/v^-)$ depend also on N/S. To estimate these four probabilities, when calibrating the classification function from step 204, a cross-validation (or a process such as bootstrapping) method may be used. Alternatively, the discrimination between the two classes may be tested on a test sub-population that has not been used for calibration.

Method 200 continues then by evaluating the dependency of these four probabilities on seismic noise. The classification function from step 204 is recalibrated after contaminating the 4D seismic with an increasing level of noise. This noise contamination changes the detectability threshold as shown on FIG. 4, and uses a generalized probability model under uncertain data.

Figure 5:
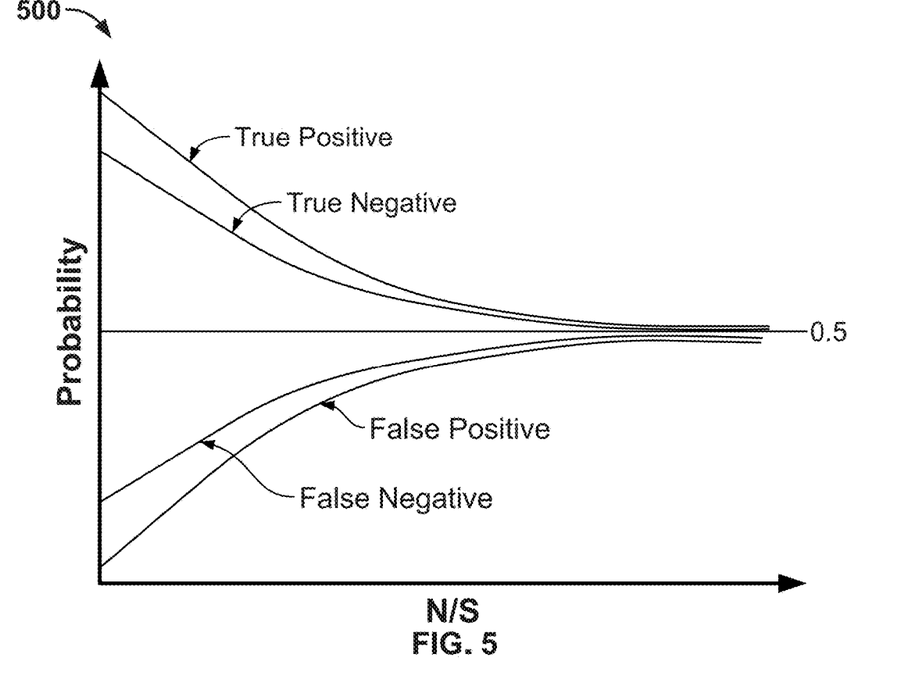
FIG. 5 is a graph showing a probability of false positive, false negative, true positive, and true negative FVC detectability diagnostic from seismic relative to N/S according to the present disclosure.

FIG. 5 shows a graph 500 that describes how the four probabilities vary with N/S. Graph 500 includes a y-axis that represents probability and an x-axis that represents N/S. In the case of extremely high N/S values, these probabilities (true positive, true negative, false positive, and false negative) converge to 0.5. In some aspects, a sub-product of step 206 is the classification function itself (which maps any 4D seismic contaminated with noise to a probability $p_{N/S}(4D^+)$).

Figure 6A:
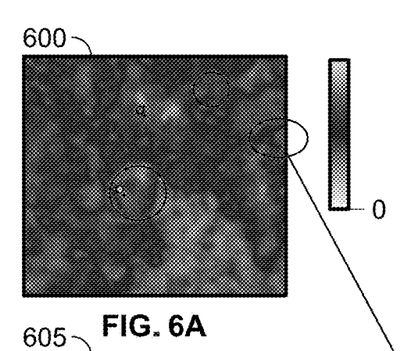
FIGS. 6A-6D illustrate images of 4D noise according to the present disclosure.

Method 200 may continue at step 208, which includes generating (for example, with the hydrocarbon production system control system 999) estimate maps of seismic detectability, $p(4D^+)$, for example, at calendar times $T_1, \ldots T_n$. For example, a local 4D noise measure is estimated directly from 4D seismic data. A root-mean-square (RMS) map of 4D amplitudes is estimated in a portion of the reservoir located uphole of the reservoir. The resulting map is scaled by a factor reflecting the ratio of amplitudes from overburden to the reservoir portion. This value is then divided by the RMS of the 4D signal to obtain a N/S map at the reservoir level. For example, as shown in FIG. 6A, an image 600 shows a N/S map at the reservoir level.

Figure 6B:
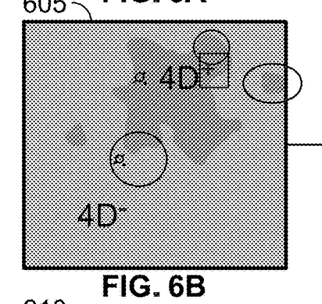

This noise can then be translated in terms of minimal detectable FVC (for example, using the results from step 204). Then, using the classification function calibrated in step 204 corresponding to the observed N/S level, $p_{N/S}(4D^-)$ and its complementary $p_{N/S}(4D^-)=1-p_{N/S}(4D^+)$ (which is the map of local seismic detectability) are estimated. From these estimations, the most probable class map ($4D^+$ or $4D^-$) can be estimated. For example, FIG. 6B shows the most probably class map 605 which corresponds to a particular calendar time.

Figure 6C:
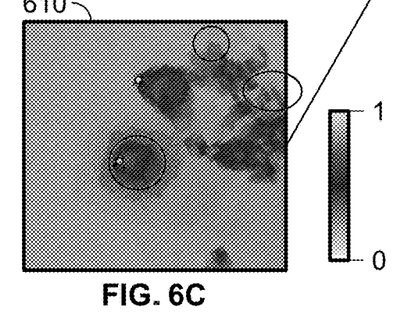

Method 200 may continue at step 210, which includes determining (for example, with the hydrocarbon production system control system 999) estimate maps of prior FVC detectability under the reservoir model noise conditions (for example, at calendar times $T_1, \ldots T_n$). For example, with respect to the prior seismic noise, it may be assumed that the reservoir model uncertainty was described by an ensemble of equally probable reservoir models, as stated previously. By repeating, for example, the Sim2Seis process to each member of the set of the process, a set of 4D amplitude cubes are produced from which a 4D noise cube (for instance, the standard deviation of the local 4D amplitude distributions) may be calculated. Similarly to the previous step, prior N/S maps can then be estimated and these maps may be transformed to minimal detectable volume maps. Then, the classification function calibrated in step 204 can be used with the desired level of N/S. By repeating this process at each position, this process results in estimating maps of prior FVC detectable under prior noise conditions p(v⁺). For example, FIG. 6C shows the estimated map 610 of prior FVC detectable under prior noise conditions p(v⁺).

Figure 6D:
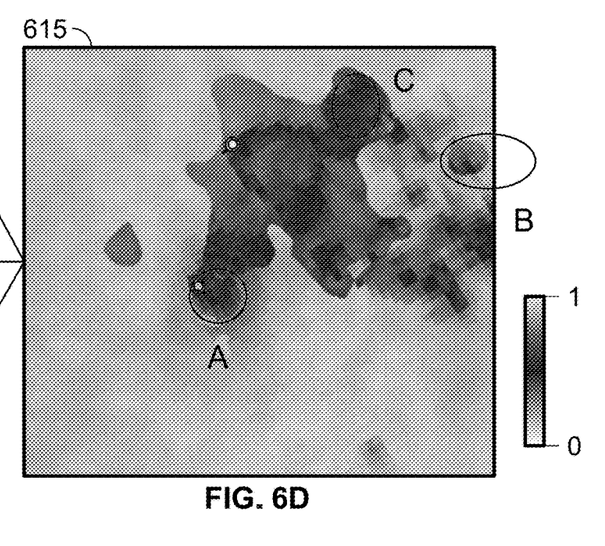

Method 200 may continue at step 212, which includes determining (for example, with the hydrocarbon production system control system 999) an updated detectable FVC probability based on the 4D seismic data. For example, Eq. set (1) may be used to determine the updated detectable FVC probability given the seismic signal. For example, FIG. 6D shows an updated FVC detectability probability map 615 (for example, with the hydrocarbon production system control system 999). In some areas, there may be no agreement between 4D seismic and the reservoir model (as for instance in zones A, B and C shown in map 615). In zone A in map 615, 4D seismic data does not detect any fluid change whereas the reservoir model does detect fluid change. However, data is more noisy in this area and therefore, the final FVC model is not much updated. In zone B of map 615, 4D seismic data detects some significant volume, contrary to the reservoir model. Four dimensional data noise is moderate, leading to a moderate increase in FVC probability. The same situation occurs in zone C, where the FVC probability update is even larger due to lower noise.

Figure 7:
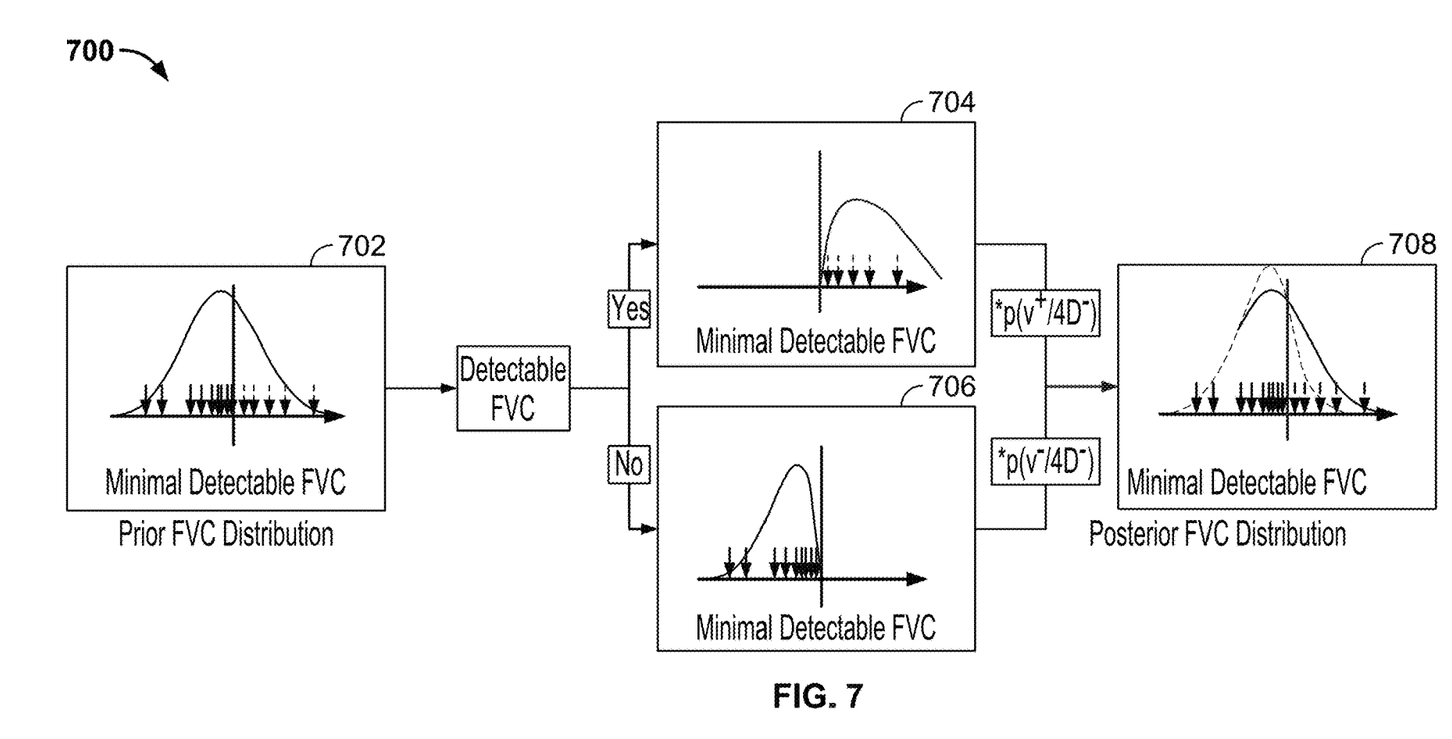
FIG. 7 illustrates an example graphical workflow for an FVC distribution update according to the present disclosure.

Method 200 may continue at step 214, which includes generating (for example, with the hydrocarbon production system control system 999) an FVC probability update. For example, FIG. 7 illustrates an FVC distribution update 700 for the negative case (4D⁻). Prior FVC probability density function p(v) (distribution) 702 at a given location and for a given seismic survey is shown, together with the estimated minimal detectable FVC 704 as defined from the synthetic dataset of step 202. In one aspect, updating this distribution includes drawing random samples from this distribution. In case there is a detectable situation (v⁺), samples less than the threshold would be discarded. In the opposite case (non-detectable situation v⁻, as shown in 706), samples greater than the threshold would be discarded. However, in a real world case, it may only be known whether samples are greater than or less than the threshold with a probability p(v⁺/4D⁺/⁻). Therefore, the two cases can be combined through a total probability axiom shown in Equation 2:

$$p(v/4D^{+/-})=p(v/v^+,4D^{+/-})p(v^+/4D^{+/-})+p(v/v^-,4D^{+/-})[1-p(v^+/4D^{+/-})] \quad \text{Eq. 2,}$$

where the terms p(v/v⁻,4D⁺/⁻) are the FVC distributions estimated from the samples greater than and less than the threshold v⁺. FVC distribution thus may be skewed towards the left hand side of Eq. 2. As shown in FIG. 7, the updated FVC distribution 708 is shown in comparison to the prior FVC distribution.

The resulting FVC volume update is detailed in Table 1, both in terms of intensity and direction (increase or decrease), depending on the degree of match between reservoir model and 4D seismic and on the intensity of 4D noise.

TABLE 1

Qualitative impact of 4D seismic for different situations

| Reservoir model | 4D anomaly Intensity | Noise | Effect |
|---|---|---|---|
| High FVC | High | Low to moderate | FVC remains high, potentially decreased or increased depending on the quantitative match between 4D seismic and the reservoir model |
| High FVC | High | High | FVC remains high, no or moderate update |
| High FVC | Low | Lower | FVC is strongly decreased |
| High FVC | Low | Moderate to high | FVC remains high, no or moderate update |
| Low FVC | High | Low to moderate | FVC is strongly increased |
| Low FVC | High | High | No or moderate FVC update (increased volume) |
| Low FVC | Low | Lower | FVC remains low but can be updated |
| Low FVC | Low | Moderate to high | FVC remains low, no to moderate update |

Method 200 may continue at step 216, which includes generating a control instruction for at least one of a hydrocarbon production system or a fluid injection system based on the updated FVC probability. For example, in some aspects, based on the updated FVC probability, the hydrocarbon production system control system 999 may control or instruct one or both of the hydrocarbon production assembly 118 or the fluid injection system 114 to adjust operation. For example, the hydrocarbon production system control system 999 may command the fluid injection system 114 to pump more or less injection fluid 106 into the injection wellbore 102 (and into the reservoir 108). As another example, the hydrocarbon production system control system 999 may command the hydrocarbon production assembly 118 to pump more or less hydrocarbon fluid 110 into the production wellbore 104. As another example, the hydrocarbon production system control system 999 may command one or more of the ICVs or ICDs 112 to allow more or less hydrocarbon fluid 110 into the production wellbore 104 from the reservoir 108.

Figure 8:
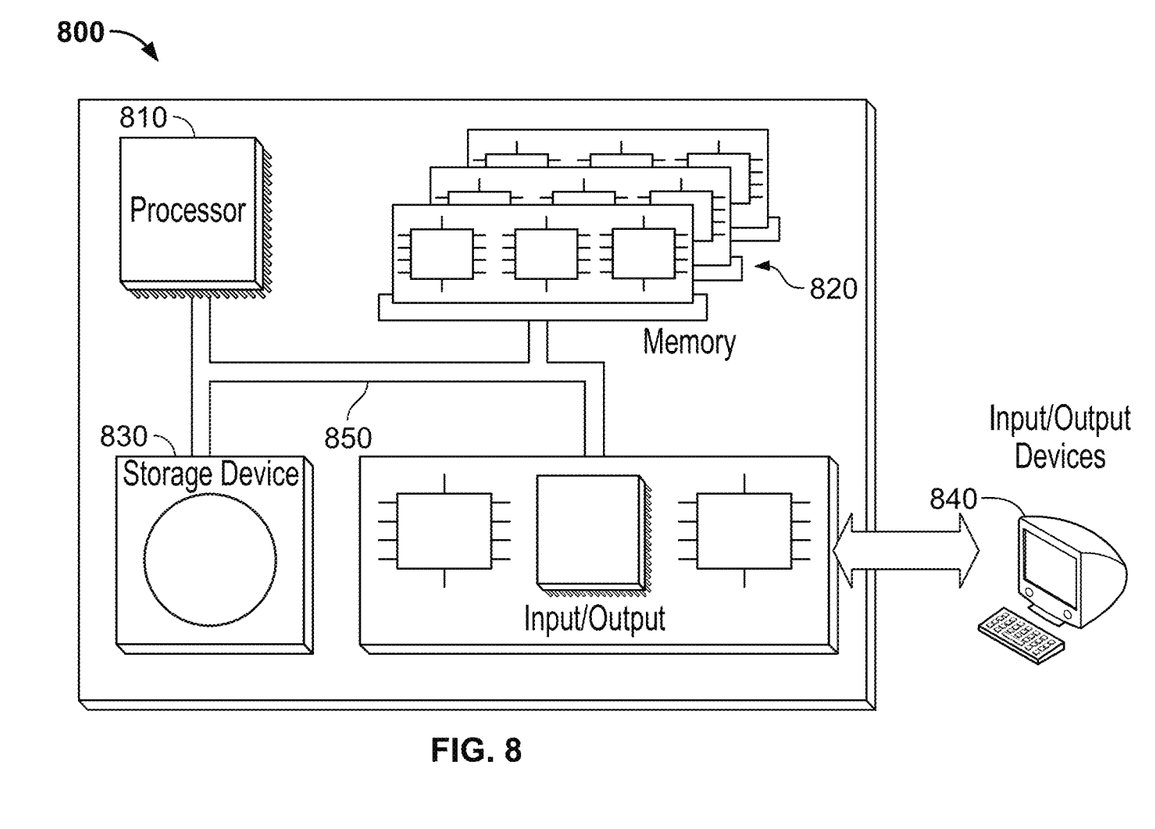
FIG. 8 illustrates a control system according to the present disclosure.

FIG. 8 illustrates a control system 800 for all are parts of a hydrocarbon production system, such as the hydrocarbon production system 100 shown in FIG. 1. The system 800 can be used for the operations described in association with any of the methods described previously (for example, method 200), for instance as or as part of the hydrocarbon production system control system 999. The system 800 is intended to include various forms of digital computers, such as laptops, desktops, workstations, personal digital assistants, servers, blade servers, or mainframes. The system 800 can also include mobile devices, such as personal digital assistants, cellular telephones, or smartphones. Additionally the system can include portable storage media, such as Universal Serial Bus (USB) flash drives. For example, the USB flash drives may store operating systems. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard or a pointing device (or both). In another implementation, the input/output device 840 includes a display unit for displaying graphical user interfaces.

Certain features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor. Method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages. The computer program can be deployed in any form, including as a stand-alone program or as a module, component, or subroutine.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as erasable programmable read-only memory (EPROM) or electrically erasable programmable read-only memory (EEPROM), solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user. Also, a keyboard and a pointing device such as a mouse or a trackball by which the user can provide input to the computer is provided. Additionally, such activities can be implemented via touchscreen flat-panel displays.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. In certain circumstances, multitasking and parallel processing may be advantageous. Moreover, the separation of various system components in the implementations described should not be understood as requiring such separation in all implementations. The described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method for controlling a hydrocarbon production system, comprising:
   determining, with a hydrocarbon production system control system, a first estimate of a prior FVC detectability probability map based on a plurality of reservoir data that comprises four-dimensional (4D) seismic data of a subterranean reservoir;
   determining, with the hydrocarbon production system control system, a second estimate of the prior FVC detectability probability map under seismic data noise conditions;
   determining, with the hydrocarbon production system control system, an updated detectable FVC probability based on the 4D seismic data, where determining the updated detectable FVC probability based on the 4D seismic data comprises evaluating a plurality of conditional probabilities that comprise:

$$\begin{cases} p(v^+/4D^+) = \dfrac{p(v^+)}{p(v^+) + [1-p(v^+)]\dfrac{p(4D^+/v^-)}{p(4D^+/v^+)}} \\ p(v^+/4D^-) = \dfrac{p(v^+)}{p(v^+) + [1-p(v^+)]\dfrac{p(4D^-/v^-)}{p(4D^-/v^+)}} \\ p(v^-/4D^+) = \dfrac{1-p(v^+)}{1-p(v^+) + p(v^+)\dfrac{p(4D^+/v^+)}{p(4D^+/v^-)}} \\ p(v^-/4D^-) = \dfrac{p(v^+)}{1-p(v^+) + p(v^+)\dfrac{p(4D^-/v^+)}{p(4D^-/v^-)}} \end{cases},$$

where $v^+$ is detectable FVC from a reservoir model, $v^-$ is undetectable FVC from the reservoir model, p is an FVC estimated map, $4D^+$ is detectable FVC from the 4D seismic data, and $4D^-$ is undetectable FVC from the 4D seismic data;
   determining, with the hydrocarbon production system control system, an updated FVC probability based on the updated detectable FVC probability and the first and second estimates of the prior FVC detectability probability maps; and
   generating, with the hydrocarbon production system control system, a control instruction for at least one of a fluid injection system or a hydrocarbon production assembly based on the updated FVC probability.

2. The computer-implemented method of claim 1, wherein the plurality of data further comprises at least one of an average reservoir model of the subterranean reservoir, a set of equally probable history-matched reservoir models of the subterranean reservoir, or a rock physics model of a rock formation of the subterranean reservoir.

3. The computer-implemented method of claim 1, further comprising:
   determining, with the hydrocarbon production system control system, an estimate of a minimal detectable FVC; and
   determining, with the hydrocarbon production system control system, an estimate of a probability that the 4D seismic data provides a correct diagnostic about the minimum detectable FVC.

4. The computer-implemented method of claim 1, further comprising:
   generating, with the hydrocarbon production system control system, at least one estimate map of seismic detectability based at least in part on the estimate of the prior FVC detectability probability map.

5. The computer-implemented method of claim 1, wherein the first estimate of the prior FVC detectability probability map is determined exclusive of seismic data noise conditions.

6. The computer-implemented method of claim 1, wherein the control instruction for at least one of the fluid injection system or the hydrocarbon production assembly comprises at least one of:
   instructing the fluid injection system to reduce or stop circulating an fluid injectant into one or more injection wellbores; or
   instructing the fluid injection system to increase a rate of circulating the fluid injectant into one or more injection wellbores.

7. The computer-implemented method of claim 1, wherein the control instruction for at least one of the fluid injection system or the hydrocarbon production assembly comprises at least one of:
   instructing the hydrocarbon production assembly to reduce or stop producing a hydrocarbon fluid from one or more production wellbores; or
   instructing one or more inflow control devices positioned on the one or more production wellbores to close.

8. The computer-implemented method of claim 1, wherein the control instruction for at least one of the fluid injection system or the hydrocarbon production assembly comprises at least two of:
   instructing the fluid injection system to reduce or stop circulating an fluid injectant into one or more injection wellbores;
   instructing the fluid injection system to increase a rate of circulating the fluid injectant into one or more injection wellbores;
   instructing the hydrocarbon production assembly to reduce or stop producing a hydrocarbon fluid from one or more production wellbores; or
   instructing one or more inflow control devices positioned on the one or more production wellbores to close.

9. The computer-implemented method of claim 2, further comprising:
   determining, with the hydrocarbon production system control system, an estimate of a minimal detectable FVC; and
   determining, with the hydrocarbon production system control system, an estimate of a probability that the 4D seismic data provides a correct diagnostic about the minimum detectable FVC.

10. The computer-implemented method of claim 9, further comprising:
    generating, with the hydrocarbon production system control system, at least one estimate map of seismic detectability based at least in part on the estimate of the prior FVC detectability probability map.

11. A hydrocarbon production system control system, comprising:
    one or more memory modules that store a plurality of reservoir data that comprises four-dimensional (4D) seismic data of a subterranean reservoir and a set of instructions; and
    one or more hardware processors configured to execute the set of instructions to perform operations comprising:

determining a first estimate of a prior FVC detectability probability map based on a plurality of reservoir data that comprises four-dimensional (4D) seismic data of a subterranean reservoir;

determining a second estimate of the prior FVC detectability probability map under seismic data noise conditions;

determining an updated detectable FVC probability based on the 4D seismic data, where determining the updated detectable FVC probability based on the 4D seismic data comprises evaluating a plurality of conditional probabilities that comprise:

$$\begin{cases} p(v^+/4D^+) = \dfrac{p(v^+)}{p(v^+) + [1 - p(v^+)]\dfrac{p(4D^+/v^-)}{p(4D^+/v^+)}} \\ p(v^+/4D^-) = \dfrac{p(v^+)}{p(v^+) + [1 - p(v^+)]\dfrac{p(4D^-/v^-)}{p(4D^-/v^+)}} \\ p(v^-/4D^+) = \dfrac{1 - p(v^+)}{1 - p(v^+) + p(v^+)\dfrac{p(4D^+/v^+)}{p(4D^+/v^-)}} \\ p(v^-/4D^-) = \dfrac{p(v^+)}{1 - p(v^+) + p(v^+)\dfrac{p(4D^-/v^+)}{p(4D^-/v^-)}} \end{cases},$$

where $v^+$ is detectable FVC from a reservoir model, $v^-$ is undetectable FVC from the reservoir model, p is an FVC estimated map, $4D^+$ is detectable FVC from the 4D seismic data, and $4D^-$ is undetectable FVC from the 4D seismic data;

determining an updated FVC probability based on the updated detectable FVC probability and the first and second estimates of the prior FVC detectability probability maps; and generating a control instruction for at least one of a fluid injection system or a hydrocarbon production assembly based on the updated FVC probability.

12. The hydrocarbon production system control system of claim 11, wherein the plurality of data further comprises at least one of an average reservoir model of the subterranean reservoir, a set of equally probable history-matched reservoir models of the subterranean reservoir, or a rock physics model of a rock formation of the subterranean reservoir.

13. The hydrocarbon production system control system of claim 11, wherein the operations further comprise:
determining an estimate of a minimal detectable FVC; and
determining an estimate of a probability that the 4D seismic data provides a correct diagnostic about the minimum detectable FVC.

14. The hydrocarbon production system control system of claim 11, wherein the operations further comprise:
generating at least one estimate map of seismic detectability based at least in part on the estimate of the prior FVC detectability probability map.

15. The hydrocarbon production system control system of claim 11, wherein the first estimate of the prior FVC detectability probability map is determined exclusive of seismic data noise conditions.

16. The hydrocarbon production system control system of claim 11, wherein the control instruction for at least one of the fluid injection system or the hydrocarbon production assembly comprises at least one of:
instructing the fluid injection system to reduce or stop circulating an fluid injectant into one or more injection wellbores; or
instructing the fluid injection system to increase a rate of circulating the fluid injectant into one or more injection wellbores.

17. The hydrocarbon production system control system of claim 11, wherein the control instruction for at least one of the fluid injection system or the hydrocarbon production assembly comprises at least one of:
instructing the hydrocarbon production assembly to reduce or stop producing a hydrocarbon fluid from one or more production wellbores; or
instructing one or more inflow control devices positioned on the one or more production wellbores to close.

18. The hydrocarbon production system control system of claim 11, wherein the control instruction for at least one of the fluid injection system or the hydrocarbon production assembly comprises at least two of:
instructing the fluid injection system to reduce or stop circulating an fluid injectant into one or more injection wellbores;
instructing the fluid injection system to increase a rate of circulating the fluid injectant into one or more injection wellbores;
instructing the hydrocarbon production assembly to reduce or stop producing a hydrocarbon fluid from one or more production wellbores; or
instructing one or more inflow control devices positioned on the one or more production wellbores to close.

19. The hydrocarbon production system control system of claim 12, wherein the operations further comprise:
determining an estimate of a minimal detectable FVC; and
determining an estimate of a probability that the 4D seismic data provides a correct diagnostic about the minimum detectable FVC.

20. The hydrocarbon production system control system of claim 19, wherein the operations further comprise:
generating at least one estimate map of seismic detectability based at least in part on the estimate of the prior FVC detectability probability map.

21. A wellbore production system, comprising:
a fluid injection system fluidly coupled to an injection wellbore and operable to circulate an injection fluid through the injection wellbore and into a subterranean reservoir;
a hydrocarbon production assembly fluidly coupled to a production wellbore and operable to circulate a hydrocarbon fluid through the production wellbore from the subterranean reservoir;
a hydrocarbon production system control system communicably coupled to the fluid injection system and the hydrocarbon production system and configured to perform operations comprising:
determining a first estimate of a prior FVC detectability probability map based on a plurality of reservoir data that comprises four-dimensional (4D) seismic data of the subterranean reservoir;
determining a second estimate of the prior FVC detectability probability map under seismic data noise conditions;
determining an updated detectable FVC probability based on the 4D seismic data, where determining the updated detectable FVC probability based on the 4D seismic data comprises evaluating a plurality of conditional probabilities that comprise:

$$\begin{cases} p(v^+/4D^+) = \dfrac{p(v^+)}{p(v^+)+[1-p(v^+)]\dfrac{p(4D^+/v^-)}{p(4D^+/v^+)}} \\ p(v^+/4D^-) = \dfrac{p(v^+)}{p(v^+)+[1-p(v^+)]\dfrac{p(4D^-/v^-)}{p(4D^-/v^+)}} \\ p(v^-/4D^+) = \dfrac{1-p(v^+)}{1-p(v^+)+p(v^+)\dfrac{p(4D^+/v^+)}{p(4D^+/v^-)}} \\ p(v^-/4D^-) = \dfrac{p(v^+)}{1-p(v^+)+p(v^+)\dfrac{p(4D^-/v^+)}{p(4D^-/v^-)}} \end{cases},$$

where $v^+$ is detectable FVC from a reservoir model, $v^-$ is undetectable FVC from the reservoir model, p is an FVC estimated map, $4D^+$ is detectable FVC from the 4D seismic data, and $4D^-$ is undetectable FVC from the 4D seismic data;

determining an updated FVC probability based on the updated detectable FVC probability and the first and second estimates of the prior FVC detectability probability maps; and generating a control instruction for at least one of the fluid injection system or the hydrocarbon production assembly based on the updated FVC probability.

22. The wellbore production system of claim 21, wherein the plurality of data further comprises at least one of an average reservoir model of the subterranean reservoir, a set of equally probable history-matched reservoir models of the subterranean reservoir, or a rock physics model of a rock formation of the subterranean reservoir.

23. The wellbore production system of claim 21, wherein the operations further comprise:
determining an estimate of a minimal detectable FVC;
determining an estimate of a probability that the 4D seismic data provides a correct diagnostic about the minimum detectable FVC; and
generating at least one estimate map of seismic detectability based at least in part on the estimate of the prior FVC detectability probability map.

24. The wellbore production system of claim 21, wherein the first estimate of the prior FVC detectability probability map is determined exclusive of seismic data noise conditions.

25. The wellbore production system of claim 21, wherein the operation of determining the updated detectable FVC probability based on the 4D seismic data comprises evaluating a plurality of conditional probabilities.

26. The wellbore production system of claim 21, wherein the control instruction comprises at least one of:
adjusting a flow rate of the injection fluid circulated by the fluid injection system through the injection wellbore;
adjusting a flow rate of the hydrocarbon fluid circulated by the hydrocarbon production assembly through the production wellbore; or
adjusting a position of one or more inflow control devices on the production wellbore.

27. The wellbore production system of claim 21, wherein the control instruction for at least one of the fluid injection system or the hydrocarbon production assembly comprises at least one of:
instructing the fluid injection system to reduce or stop circulating an fluid injectant into one or more injection wellbores; or
instructing the fluid injection system to increase a rate of circulating the fluid injectant into one or more injection wellbores.

28. The wellbore production system of claim 21, wherein the control instruction for at least one of the fluid injection system or the hydrocarbon production assembly comprises at least one of:
instructing the hydrocarbon production assembly to reduce or stop producing a hydrocarbon fluid from one or more production wellbores; or
instructing one or more inflow control devices positioned on the one or more production wellbores to close.

29. The wellbore production system of claim 21, wherein the control instruction for at least one of the fluid injection system or the hydrocarbon production assembly comprises at least two of:
instructing the fluid injection system to reduce or stop circulating an fluid injectant into one or more injection wellbores;
instructing the fluid injection system to increase a rate of circulating the fluid injectant into one or more injection wellbores;
instructing the hydrocarbon production assembly to reduce or stop producing a hydrocarbon fluid from one or more production wellbores; or
instructing one or more inflow control devices positioned on the one or more production wellbores to close.

30. The wellbore production system of claim 22, wherein the operations further comprise:
determining an estimate of a minimal detectable FVC;
determining an estimate of a probability that the 4D seismic data provides a correct diagnostic about the minimum detectable FVC; and
generating at least one estimate map of seismic detectability based at least in part on the estimate of the prior FVC detectability probability map.

31. The wellbore production system of claim 30, wherein the first estimate of the prior FVC detectability probability map is determined exclusive of seismic data noise conditions, and the operation of determining the updated detectable FVC probability based on the 4D seismic data comprises evaluating a plurality of conditional probabilities.

* * * * *